INVENTORS
Cyril G. Veinott and
Wendell C. Spear.
BY O. B. Buchanan
ATTORNEY

Patented Nov. 18, 1941

2,262,870

UNITED STATES PATENT OFFICE 2,262,870

SELF-STARTING SINGLE-PHASE MOTOR AND ITS CONTROL

Cyril G. Veinott, Lima, and Wendell C. Spear, Wapakoneta, Ohio, assignors to Westinghouse Electric & Manufacturing Company, East Pittsburgh, Pa., a corporation of Pennsylvania Application April 13, 1940, Serial No. 329,449

22 Claims. (Cl. 172—279)

Our invention relates to self-starting single-phase induction-motors, and to novel and improved means for starting the same, and also novel and improved means for delaying the starting of the same.

An object of our invention relates to the provision of a motor of the class described, having two complete, inductively related main-windings which are adapted to be connected, at times, in parallel, and a quadrature-related, dephased-current, starting winding-means, with novel connections for starting the motor by applying line-voltage to only one of the main windings and utilizing the other main winding to energize the starting winding-means. After the motor has attained a sufficient speed, the two main windings may be connected in parallel across the supply-line, either with, or without, the deenergization of the starting winding-means.

A further object of our invention relates to the delayed starting of a three-winding motor of the type just described, whereby the motor is initially energized by applying the line-voltage to only one of the two main windings, in combination with novel control-means whereby starting is delayed, and at the same time the noise-hum is practically eliminated, and the rotor-heating is very materially reduced, by providing a closed-circuiting path which close-circuits both the second main winding and the starting winding-means. Starting is thereafter effected by the time-delayed opening of the closed-circuiting path.

Figure 1:
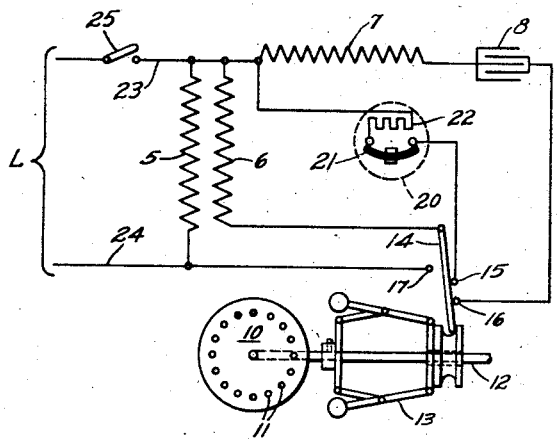
Figure 2:
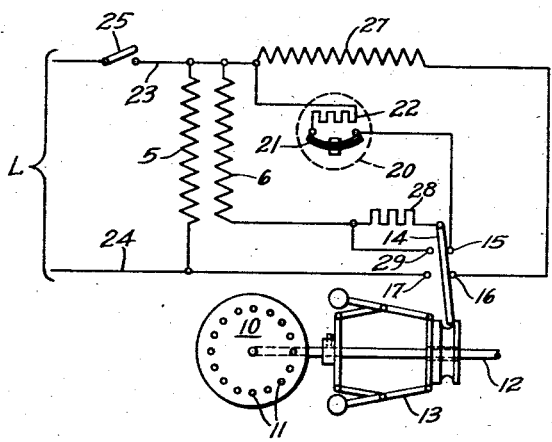
Figure 3:
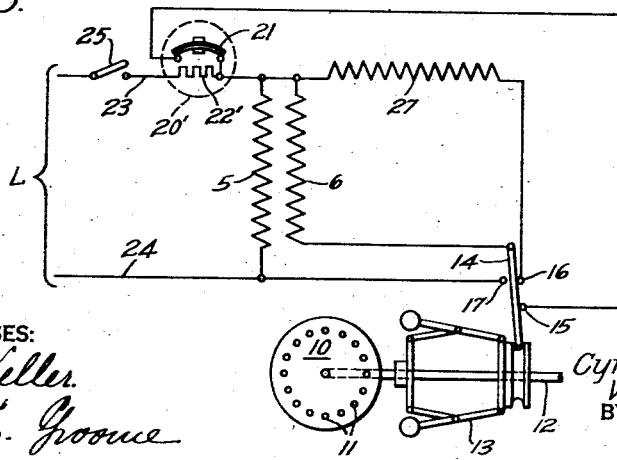

With the foregoing and other objects in view, our invention relates to the apparatus, methods, combinations and systems hereinafter described and claimed, and illustrated in the accompanying drawing, wherein:

Figures 1, 2 and 3 are diagrammatic views of circuits and apparatus embodying our invention in three different illustrative forms of embodiment thereof.

In Figure 1, we illustrate our invention as applied to a single-phase induction motor having a primary member or stator element carrying two main windings 5 and 6 and an auxiliary starting-winding 7. The two main windings 5 and 6 are substantially in space-phase with each other, and preferably each of the two main windings is a complete winding, with winding-portions disposed on, or for, each pole of the motor, the corresponding winding-portions of the two main windings being mutually coupled to each other, preferably by being wound in the same slots.

The auxiliary starting-winding is illustrated, in Fig. 1, as being a capacitor-winding, connected in series with a capacitor 8, so that the entire starting winding-means includes both the winding-proper 7 and the capacitor 8. I desire it to be understood, however, that this illustration of a capacitor-type starting-winding is intended to be symbolic of any starting winding-means which, in general, may be regarded as comprising a winding disposed in substantially quadrature space-relation to the main windings 5 and 6, and adapted to have a current out of phase with the current in the main windings.

The motor is also provided with a secondary or rotor-member 10 which is provided with a squirrel-cage winding 11 or other poly-axially short-circuited secondary winding. The rotor-member 10 is mounted on a shaft 12 which carries a centrifugal device or speed-governor 13 which operates a start-run switch 14 having two back-contacts 15 and 16 and one front-contact or make-contact 17.

The motor is also provided with a time-delay starting-means which is illustrated as being in the form of a current-responsive switching-device which is illustrated in the form of a motor-mounted thermally responsive switching-means 20 having a bimetallic switch-contact element 21 and a heating resistance 22 disposed in direct heating-relation to the bimetallic switching-element 21. The bimetallic contacts 21 are normally closed and are adapted to open automatically when the thermally responsive switching-means 20 is heated to a predetermined temperature, either by the heat produced in the heating-resistance 22 of the thermally responsive device, or by heat which is directly radiated to the thermally responsive device from the motor which is being controlled. As schematically illustrated in the drawing, the thermally responsive device 20 is disposed in juxtaposition to the motor, so that it is in direct heat-transfer relation thereto, being usually mounted on the stator element which carries the three windings 5, 6 and 7.

The motor is also provided with two line-terminals 23 and 24 which are adapted to be energized, from a single-phase line L, as by means of a line-switch 25 in one of the line-terminals 23.

One of the two main windings, such as the winding 5, has its terminals connected to the two line-terminals 23 and 24, respectively. In the particular form of embodiment shown in Fig. 1, the other main winding 6 has one terminal connected to the line-terminal 23, and the other terminal connected to the movable switch-arm 14 of the speed-responsive device. The auxiliary starting-winding 7 is connected, in series with its phase-shifting capacitor 8, between the line-terminal 23 of the back-contact 16 which is in engagement with the centrifugal switch 14 in the starting position of the latter. The heating element 22 and the terminal contacts 21 of the thermally responsive device 20 are connected in series with each other in a short-circuiting or closed-circuiting circuit extending from the line-terminal 23 to the back-contact 15 which is in contact with the switch-arm 14 in the starting position of the centrifugal switch-device. The make-contact 17, which is engaged by the centrifugal switch-arm 14 only in the running-speed position of the latter, is permanently connected to the second line-terminal 24.

In operation, when single-phase power is applied to the line-terminals 23 and 24 of the motor in Fig. 1, as by closure of the line-switch 25, the first main-winding 5 is immediately energized, and the second main-winding 6 has voltage induced therein by transformer action from the first main-winding 5. The second main-winding 6 is connected, through the switch-arm 14 and the back-contact 15, to the closed circuit 21—22 which provides a fairly low-impedance path connected across the terminals of the second main-winding 6, so that very little voltage appears thereacross. Tests have shown that the current flowing in this closed circuit 21—22 under these conditions is a moderate current which the stator element of the motor can easily withstand for a limited time. The second main-winding 6 is also connected, through the switch-arm 14 and the back-contact 16, to the auxiliary starting winding-means 7—8, but the latter receives a voltage which is far too low to cause a starting operation of the motor, as long as the bimetallic switch-contact 21 is closed in the closed-circuit 21—22 which is connected both across the terminals of the second main-winding 6 and across the terminals of the auxiliary winding-means 7—8.

As soon as the line-terminals 23 and 24 are energized, therefore, a moderately large current begins to flow in the closed-circuiting path including the closed contacts 21 and the heating resistance 22 of the thermally responsive device 20. After an elapse of a predetermined time, for which the thermally responsive device 20 is adjusted, the heater 22 heats the bimetallic strip or disc 21 to a sufficient extent to cause the switch-contacts to snap open, thereby removing the closed-circuit path from across the terminals of the second main-winding 6 as well as from across the terminals of the auxiliary starting winding-means 7—8. This immediately causes the transformer-voltage induced in the second main-winding 6 to be applied to the starting winding-circuit 7—8, thus impressing, on the starting winding-circuit, a voltage which is nearly as large as the full line-voltage, or at least sufficiently closely approximating the line-voltage to produce a starting-operation of the motor. The voltage impressed on the starting-winding circuit 7—8 is approximately in phase with the line voltage, just as the secondary voltage of a transformer is approximately in phase with the primary voltage.

When the motor achieves a certain predetermined percentage of its running-speed, the centrifugal governor 13 actuates the switch-arm 14 so as to disengage the back-contacts 15 and 16 and engage the front-contact 17, which results in connecting the second main-winding 6 in parallel with the first main-winding 5, across the line-terminals 23 and 24. At the same time, the starting winding-means 7—8 is altogether de-energized, although this feature is not a necessary part of my invention. It is noted, also, that the actuation of the centrifugal switch-arm 14 to its running position results in open-circuiting the closed-circuit path 21—22 at the back-contact 15, so that, when the bimetallic switch-contacts 21 subsequently reclose, as they will do, after a certain period of time, as a result of the cooling of the thermally responsive device 20 when its heater 22 is deenergized, the reclosure of these bimetallic contacts 21 will not result in again short-circuiting either the main winding 6 or the auxiliary winding-means 7—8, as long as the centrifugal switch-arm 14 is in its running position in engagement with the front-contact 17.

The closed-circuiting path which is provided by the elements 21 and 22 of the thermally responsive device 20, in the circuits hereinabove described, and shown in Fig. 1, serves several important functions, which will be mentioned, not necessarily in the order of their merit.

When only one of the two normally parallel-connected windings 5 and 6 is energized, the current is limited by the resistance of the primary and rotor windings, and by the leakage-reactance of both the primary and the rotor. Under such conditions a large current flows in the rotor; as is well known to the art, this current, referred to the primary, is substantially the same as the stator current, that is, large. To generate sufficient voltage in the rotor to overcome to the voltage-drops due to rotor-resistance and leakage-reactance, a considerable amount of flux must traverse the air-gap. The amount of flux crossing the air-gap of a motor as previously constructed, under locked-rotor conditions, may be from one third to two thirds of the normal air-gap flux at no load or running light. With this amount of flux crossing the air-gap a distinct and objectional hum is set up; in a 60-cycle motor, the frequency of this audible hum being 120 cycles. Unit-heaters employ, in their construction, a large amount of sheet-metal, which often picks up and amplifies this hum to objectionable proportions.

One of the objects of our invention is to eliminate this hum during the delay-period while the terminals 23 and 24 are energized, and before the thermally responsive switching means 20 opens. During this period we energize only one of the two normally parallel-connected main-windings 5 and 6, and we short-circuit the main-winding 6. The short-circuit current in the winding-section 6 is nearly equal to the current in the winding-section 5, and thus the two windings oppose each other, leaving substantially no flux to cross the air-gap. When practically no flux crosses the air-gap, the 120-cycle hum is strikingly reduced.

While we are not limited to any particular magnitudes, it may be mentioned, as giving some indication of the order of improvement expectable, that the change from energizing both sections 5 and 6 of the main-winding, in parallel, from the line-voltage, to energizing only one of these sections and short-circuiting or closed-circuiting the other section, resulted in a reduction of the noise, in one particular instance, from 56 decibels to 29 decibels, corresponding to a reduction in loudness, to the human ear, in the ratio of approximately 10 to 1, or a reduction in the acoustic energy in the ratio of approximately 500 to 1. This reduction in the magnetic hum is particularly important in unit-heater installations in which there is a large quantity of sheet-metal which serves as a sounding board for picking up and intensifying the noise.

As mentioned before, our reduction in the motor-flux during the time-delay period, when the motor is energized but is not permitted to start, is also important in considerably reducing the flux which reaches the secondary member 10 of the motor, thus resulting in a very considerable reduction in the heating of the secondary member during this time-delay period. This reduction in the temperature of the secondary or rotor-member of the motor may be so great, in some instances, as to permit the use of a soft-soldered rotor instead of a brazed or indestructible rotor, thus offering a material advantage from the standpoint of cost.

Another advantage of the utilization of our closed-circuiting path 21—22 is that it makes use of a standard type of closed-contact thermostatic disc-switch, utilizing a bimetallic dished disc-element having contacts which are closed in the cold position of the switch, as distinguished from a thermostatic switch having normally open contacts, or contacts which are open when the switch is cold. This is a desirable feature, from a practical standpoint, because there are already developed, and available on the market, a number of thermostatic snap-action switches having normally closed contacts, in a range of sizes and ratings which are suitable for the purpose at hand, whereas the utilization of a thermostatic switch having normally open contacts would, as a practical matter, require the development of a special thermostatic switch, which would not only entail certain costs, in its development, but which would also lack the quantity-production advantages which are derived from utilizing a standard switch of a type which already has a number of other commercial uses.

Our utilization of a thermostatic time-delay switch which is responsive, not only to the heating of its own heating-element 22, but which is also in direct heat-receiving relation to the motor itself, or to some portion of the stator-member of the motor, has the important practical result of causing the time-delay period to be variable in accordance with the initial temperature of the motor, because it will take a shorter time for the heating element 22 to raise the bimetallic switch 21 to its critical temperature when the motor is hot, than when the motor is cold. In unit-heater applications, this is a most desirable feature, because it likewise takes a shorter time to heat up the heater, when the heater is initially warm, than when the heater is initially cold. Our placement of the thermally responsive time-delay element 20 in heat-conducting relation to the motor is, therefore, a valuable means for achieving a time-delay period which is inherently and automatically variable in a desired manner.

It will be further noted that our utilization of a so-called internal time-delay switching-element 20, or an element which is built into the motor itself, as distinguished from an external time-delaying switching-device, has an advantage in installation and wiring costs, as well as an advantage from the standpoint of simplicity and neatness of appearance, thus avoiding the expense of separately mounting, and making the electrical connections to and from, an external timing device, and producing a simpler and neater motor-combination.

Our invention is, of course, not limited to the particular form of embodiment shown in Fig. 1. By way of suggestion as to some of the possibilities of variations in design, we have shown, in Fig. 2, a motor in which the starting-winding 27 is a split-phase winding rather than a capacitor-winding, the split-phase winding having inherently such ratio of resistance to inductance as to cause the current therein to be dephased with respect to the current in the main-windings 5 and 6.

In Fig. 2, also, the second main-winding 6, which serves as a transformer-secondary during the initial time-delay period, as well as during the relatively brief, subsequent, starting-period, is provided with a serially connected external resistor 28, which is shown as being connected between the winding 6 and the centrifugal switch-arm 14; and the centrifugal switching device is provided with a second make-contact 29, which is engaged by the switch-arm 14 in the running position of the switch, and which is utilized to short-circuit the auxiliary resistor 28. This auxiliary resistor 28, during the initial time-delay which is provided by the thermally responsive device 20, serves to somewhat reduce the magnitude of the current flowing in the closed-circuiting path 28—21—22; while at the same time the lower-resistance circuit 21—22 practically short-circuits the auxiliary starting-winding 27 and prevents the application of voltage to the latter. During the starting-period, before the bimetallic snap-switch 21 has opened, the auxiliary resistor 28 is in series with the split-phase starting-winding 27, which is, in many cases, an advantage in assisting in dephasing the starting-winding current as compared with the currents in the main-windings 5 and 6.

In Fig. 3, we show a somewhat modified wiring-diagram which sometimes lends itself to less critical adjustment of the timing of the thermal element 20 with respect to the characteristics of the motor which is to be controlled. In said Fig. 3, the thermal device is designated by the numeral 20', and it is provided with a heating-resistor 22' which is serially connected with the motor-terminal 23, so that it is traversed by the entire input-current of the motor, rather than simply by the short-circuit current of the second main-winding 6. As in the previously described figures, the bimetallic contact-element 21 of the thermal device 20' is connected in series with the centrifugal switch-members 14—15, and across the terminals of the second main-winding 6. Except for the recalibration of the thermal device 20', the operation of the embodiment of our invention shown in Fig. 3 is essentially the same as that which has previously been described.

While we have illustrated our invention in three different forms of embodiment, which are at present preferred by us, we desire it to be understood that our invention is not limited thereto, as many changes may be made by the skilled workers of the art, by way of additions, substitutions and omissions, without departing from the essential spirit of our invention, particularly in its broader aspects. We desire, therefore, that the appended claims shall be accorded the broadest construction consistent with their language and the prior art.

We claim as our invention:

1. A delayed-start, single-phase motor having two main winding-means substantially in space-phase with each other, said two main winding-means being disposed in mutually inductive transformer-relation to each other, and a substantially quadrature-related starting winding-means of a type adapted to have current out of phase with the current in the main winding-means, a pair of line-terminals connected to a first one of the main winding-means, means for initially providing a closed circuit for the second main winding-means and for initially causing the starting winding-means to be de-energized to such an extent that starting does not ensue when single-phase electrical energy is first applied to the line-terminals, and time-delayed current-responsive means, responsive to a predetermined current in said motor, for interposing a time-delay after the application of electrical energy to the line-terminals and for subsequently opening said closed circuit and causing the starting winding-means to be energized from said second main winding-means.

2. A delayed-start, single-phase motor having two main winding-means substantially in space-phase with each other, said two main winding-means being disposed in mutually inductive transformer-relation to each other, and a substantially quadrature-related starting winding-means of a type adapted to have current out of phase with the current in the main winding-means, a pair of line-terminals connected to a first one of the main winding-means, means for initially providing a closed circuit for the second main winding-means and for initially causing the starting winding-means to be de-energized to such an extent that starting does not ensue when single-phase electrical energy is first applied to the line-terminals, time-delayed current-responsive means, responsive to a predetermined current in said motor, for interposing a time-delay after the application of electrical energy to the line-terminals and for subsequently opening said closed circuit and causing the starting winding-means to be energized from said second main winding-means, whereby the motor starts, and start-run switching-means, operable after the motor has started, for energizing said second main winding-means across the line-terminals in parallel to said first main winding-means.

3. A delayed-start, single-phase motor having two main winding-means substantially in space-phase with each other, said two main winding-means being disposed in mutually inductive transformer-relation to each other, and a substantially quadrature-related starting winding-means of a type adapted to have current out of phase with the current in the main winding-means, a pair of line-terminals connected to a first one of the main winding-means, means for initially providing a closed circuit for the second main winding-means and for initially causing the starting winding-means to be de-energized to such an extent that starting does not ensue when single-phase electrical energy is first applied to the line-terminals, time-delayed current-responsive means, responsive to a predetermined current in said motor, for interposing a time-delay after the application of electrical energy to the line-terminals and for subsequently opening said closed circuit and causing the starting winding-means to be energized from said second main winding-means, whereby the motor starts, and start-run switching-means, operable after the motor has started, for causing said second main winding-means to be disconnected from said starting winding-means and for energizing said second main winding-means across the line-terminals in parallel to said first main winding-means.

4. A delayed-start, single-phase motor having two main winding-means substantially in space-phase with each other, said two main winding-means being disposed in mutually inductive transformer-relation to each other, and a substantially quadrature-related starting winding-means of a type adapted to have current out of phase with the current in the main winding-means, a pair of line-terminals connected to a first one of the main winding-means, means for initially providing a closed circuit for the second main winding-means and for initially causing the starting winding-means to be de-energized to such an extent that starting does not ensue when single-phase electrical energy is first applied to the line-terminals, time-delayed current-responsive means, responsive to a predetermined current in said motor, for interposing a time-delay after the application of electrical energy to the line-terminals and for subsequently opening said closed circuit and causing the starting winding-means to be energized from said second main winding-means, whereby the motor starts, and start-run switching-means, operable after the motor has started, for substantially open-circuiting said starting winding-means and for energizing said second main winding-means across the line-terminals in parallel to said first main winding-means.

5. A delayed-start, single-phase motor having two main winding-means substantially in space-phase with each other, said two main winding-means being disposed in mutually inductive transformer-relation to each other, and a substantially quadrature-related starting winding-means of a type adapted to have current out of phase with the current in the main winding-means, a pair of line-terminals connected to a first one of the main winding-means, and a thermally responsive switch having initially closed contacts initially connected in closed-circuiting relation across both the second main winding-means and the starting winding-means, said thermally responsive switch being located in direct heat-receiving relation to said motor and also having an electrically energized heating-element of its own, said thermally responsive switch operating, after a time-delay after the application of electrical energy to said line-terminals, to open its contact, thereby causing said starting winding-means to be effectively energized from said second main winding-means so as to start the motor.

6. A delayed-start, single-phase motor having two main winding-means substantially in space-phase with each other, said two main winding-means being disposed in mutually inductive transformer-relation to each other, and a substantially quadrature-related starting winding-means of a type adapted to have current out of phase with the current in the main winding-means, a pair of line-terminals connected to a first one of the main winding-means, a thermally responsive switch having initially closed contacts initially connected in closed-circuiting relation across both the second main winding-means and the starting winding-means, said thermally responsive switch being located in direct heat-receiving relation to said motor and also having an electrically energized heating-element of its own, said thermally responsive switch operating, after a time-delay after the application of electrical energy to said line-terminals, to open its contact, thereby causing said starting winding-means to be effectively energized from said second main winding-means so as to start the motor, and start-run switching-means, operable after the motor has started, for energizing said second main winding-means across the line-terminals in parallel to said first main winding-means.

7. A delayed-start, single-phase motor having two main winding-means substantially in space-phase with each other, said two main winding-means being disposed in mutually inductive transformer-relation to each other, and a substantially quadrature-related starting winding-means of a type adapted to have current out of phase with the current in the main winding-means, a pair of line-terminals connected to a first one of the main winding-means, a thermally responsive switch having initially closed contacts initially connected in closed-circuiting relation across both the second main winding-means and the starting winding-means, said thermally responsive switch being located in direct heat-receiving relation to said motor and also having an electrically energized heating-element of its own, said thermally responsive switch operating, after a time-delay after the application of electrical energy to said line-terminals, to open its contact, thereby causing said starting winding-means to be effectively energized from said second main winding-means so as to start the motor, and start-run switching-means operable after the motor has started, for causing said second main winding-means to be disconnected from said starting winding-means and for energizing said second main winding-means across the line-terminals in parallel to said first main winding-means.

8. A delayed-start, single-phase motor having two main winding-means substantially in space-phase with each other, said two main winding-means being disposed in mutually inductive transformer-relation to each other, and a substantially quadrature-related starting winding-means of a type adapted to have current out of phase with the current in the main winding-means, a pair of line-terminals connected to a first one of the main winding-means, a thermally responsive switch having initially closed contacts initially connected in closed-circuiting relation across both the second main winding-means and the starting winding-means, said thermally responsive switch being located in direct heat-receiving relation to said motor and also having an electrically energized heating-element of its own, said thermally responsive switch operating, after a time-delay after the application of electrical energy to said line-terminals, to open its contact, thereby causing said starting winding-means to be effectively energized from said second main winding-means so as to start the motor, and start-run switching-means, operable after the motor has started, for substantially open-circuiting said starting winding-means and for energizing said second main winding-means across the line-terminals in parallel to said first main winding-means.

9. The invention as defined in claim 1, characterized by said two main winding-means each having corresponding mutually coupled winding-portions for each pole of the motor.

10. The invention as defined in claim 2, characterized by said two main winding-means each having corresponding mutually coupled winding-portions for each pole of the motor.

11. The invention as defined in claim 4, characterized by said two main winding-means each having corresponding mutually coupled winding-portions for each pole of the motor.

12. The invention as defined in claim 5, characterized by said two main winding-means each having corresponding mutually coupled winding-portions for each pole of the motor.

13. The invention as defined in claim 6, characterized by said two main winding-means each having corresponding mutually coupled winding-portions for each pole of the motor.

14. The invention as defined in claim 8, characterized by said two main winding-means each having corresponding mutually coupled winding-portions for each pole of the motor.

15. A delayed-start, single-phase motor having two main winding-means substantially in space-phase with each other, said two main winding-means being disposed in mutually inductive transformer-relation to each other, and a substantially quadrature-related starting winding-means, a pair of line-terminals connected to a first one of the main winding-means, a phase-controlling impedance-device connected in a circuit serially including the second main winding-means and said starting winding-means, means including normally closed switching-means for initially providing a closed circuit directly across the terminals of said starting winding-means, and time-delayed current-responsive means, responsive to a predetermined current in said motor, for opening said switching-means, thereby interposing a time-delay in the energization of the starting winding-means after the application of electrical energy to the line-terminals and for subsequently opening said closed circuit.

16. A delayed-start, single-phase motor having two main winding-means substantially in space-phase with each other, said two main winding-means being disposed in mutually inductive transformer-relation to each other, and a substantially quadrature-related starting winding-means, a pair of line-terminals connected to a first one of the main winding-means, a phase-controlling impedance-device connected in a circuit serially including the second main winding-means and said starting winding-means, means including normally closed switching-means for initially providing a closed circuit directly across the terminals of said starting winding-means, time-delayed current-responsive means, responsive to a predetermined current in said motor, for opening said switching-means, thereby interposing a time-delay in the energization of the starting winding-means after the application of electrical energy to the line-terminals and for subsequently opening said closed circuit, and start-run switching-means, operable after the motor has started, for disconnecting said impedance-device and said starting winding-means from said second main winding-means and for energizing said second main winding-means across the line-terminals in parallel to said first main winding-means.

17. A delayed-start, single-phase motor having two main winding-means substantially in space-phase with each other, said two main winding-means being disposed in mutually inductive transformer-relation to each other, and a substantially quadrature-related starting winding-means, a pair of line-terminals connected to a first one of the main winding-means, a phase-controlling impedance-device connected in a circuit serially including the second main winding-means and said starting winding-means, and a thermally responsive switch having initially closed contacts initially connected in closed-circuiting relation directly across the terminals of said starting winding-means, said thermally responsive switch being located in direct heat-receiving relation to said motor and also having an electrically energized heating-element of its own, said thermally responsive switch operating, after a time-delay after the application of electrical energy to said line-terminals, to open its contact.

18. A delayed-start, single-phase motor having two main winding-means substantially in space-phase with each other, said two main winding-means being disposed in mutually inductive transformer-relation to each other, and a substantially quadrature-related starting winding-means, a pair of line-terminals connected to a first one of the main winding-means, a phase-controlling impedance-device connected in a circuit serially including the second main winding-means and said starting winding-means, a thermally responsive switch having initially closed contacts initially connected in closed-circuiting relation directly across the terminals of said starting winding-means, said thermally responsive switch being located in direct heat-receiving relation to said motor and also having an electrically energized heating-element of its own, said thermally responsive switch operating, after a time-delay after the application of electrical energy to said line-terminals, to open its contact, and start-run switching-means, operable after the motor has started, for disconnecting said impedance-device and said starting winding-means from said second main winding-means and for energizing said second main winding-means across the line-terminals in parallel to said first main winding-means.

19. The invention as defined in claim 15, characterized by said two main winding-means each having corresponding mutually coupled winding-portions for each pole of the motor.

20. The invention as defined in claim 16, characterized by said two main winding-means each having corresponding mutually coupled winding-portions for each pole of the motor.

21. The invention as defined in claim 17, characterized by said two main winding-means each having corresponding mutually coupled winding-portions for each pole of the motor.

22. The invention as defined in claim 18, characterized by said two main winding-means each having corresponding mutually coupled winding-portions for each pole of the motor.

CYRIL G. VEINOTT.
WENDELL C. SPEAR.